3,686,148
FIBER-FORMING POLYAMIDES WITH AN INCREASED CONTENT OF AMINO GROUPS PROVIDED BY A CYCLOALIPHATIC-AROMATIC POLYAMINE
Walter Fester, Konigstein, Taunus, Ernst Hanschke, Burghausen, and Franz Jakob, Hofheim, Taunus, Germany, assignors to Farbwerke Hoechst Aktiengesellschaft vormals Meister Lucius & Bruning, Frankfurt am Main, Germany
No Drawing. Filed Aug. 19, 1970, Ser. No. 65,299
Claims priority, application Germany, Aug. 26, 1969, P 19 43 252.1
Int. Cl. C08g 20/20
U.S. Cl. 260— 78 TF    12 Claims

ABSTRACT OF THE DISCLOSURE

Novel film and fiber-forming modified polyamides with an increased content of amino groups are obtained, if in the preparation of polyamides from the common starting compounds, polyamines are added which have partly aromatic, and partly cyclo-aliphatic molecular structural units, optionally in admixture with cyclo-aliphatic polyamines which may also have 1 aliphatic C-atom between the cyclo-aliphatic rings and the amino groups.

---

The present invention relates to fiber-forming polyamides with an increased content of amino groups and to a process for making them.

Polyamides from amino-carboxylic acids and their derivatives, for example lactams, such as ε-caprolactam, or from diamines and dicarboxylic acids, such as polyhexamethylene diammonium adipate, have besides acid end groups also basic end groups, which consist for the most part of amino groups.

These amino groups are decisive for the affinity of the polyamide for the acid dyestuffs. It is, therefore, desirable that polyamides or the fibers and filaments manufactured thereof, which are to be dyed with acid dyestuffs, should have a content of amino groups which is as high as possible. The number of basic groups in an unmodified polyamide is limited, due to its high molecular weight, since only the end groups of the polymer consist of amino or carboxyl groups. Thus, for example, an unmodified polyamide 6 contains, as a rule, of from 40 to 50 milli-equivalents of $NH_2$-groups per kilogram, depending on the process of preparation and its molecular weight.

It is known that the number of basic groups can be increased by adding amines, such as hexamethylene diamine, diethylene triamine, polyethylene imine, or xylylene diamine, to the polycondensation mixture or the polycondensate.

However, the whiteness of these products does not meet the requirements which are normally demanded from a raw material for fibers. In particular, if amines having aromatic groups are used as modification agents, only products showing discoloration are obtained. Moreover, if these amines are used for modification, sufficiently high molecular weights of the corresponding polyamides cannot be obtained. With a modification of this kind, both an improvement of the whiteness and an increase of the molecular weight can be obtained by adding phosphorus compounds, such as phosphoric acid or its esters. However, the addition of phosphorus compounds, in particular, may be a drawback, if $TiO_2$ is to be added to the polyamide as dulling agent, since the phosphoric acid or the amine salt which is formed lead to a coagulation of the $TiO_2$ suspension introduced, which results in considerable difficulties in spinning.

In Canadian Pat. No. 837,201 it has been proposed to use, as modification component for the preparation of polyamides with an increased content of amino groups and an excellent whiteness, at least one cyclo-aliphatic polyamine of the general formula

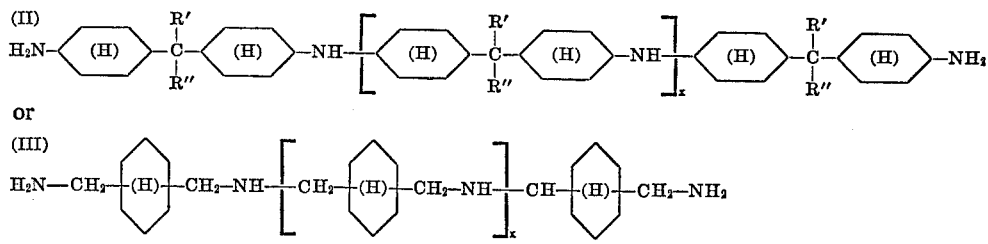

in which $x$ represents 0 or a whole number of from 1 to 30, preferably from 0 to 10, R' represents H, —$CH_3$, —$C_2H_5$ and
R" represents H, —$CH_3$, —$C_2H_5$, the ring linkages in Formula III being preferably meta- and para-linkages (=1,3- and 1,4-linkages).

Surprisingly, it has been found that products of an excellent degree of whiteness are obtained if, as modification agents for the preparation of film and fiber-forming modified polyamides with an increased content of amino groups, polyamines are used which have partly aromatic, and partly cyclo-aliphatic structural units in the molecule (which may further contain 1 aliphatic C-atom between the aromatic or the cyclo-aliphatic rings and the amino groups), optionally, in admixture with cyclo-aliphatic polyamines (which may also have 1 aliphatic C-atom between the cyclo-aliphatic ring and the amino group).

The result was particularly surprising, as polyamides modified by the corresponding fully aromatic amines show a strong yellow discoloration, when exposed to elevated temperatures. It is only by incorporation of cyclo-aliphatic rings into the aromatic polyamines, that the thermal stability of polyamides modified by them can be considerably improved. There is no stabilizing effect of the cyclo-aliphatic components, if cyclo-aliphatic polyamines are mixed with purely aromatic polyamines, and the mixture is used for the modification of polyamides. This stabilizing effect of cycloaliphatic ring systems is a new finding and has never been described before in this form.

It is advantageous to use those polyamines having partly aromatic, and partly cyclo-aliphatic structural units in the molecule, which correspond to the general Formula I:

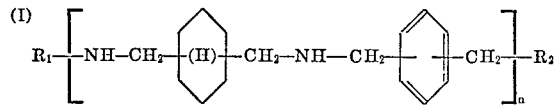

in which $n$ represents a whole number of from 1 to 10, preferably from 1 to 3, $R_1$ represents H or

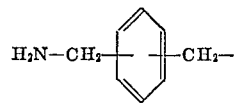

$R_2$ represents —$NH_2$ or

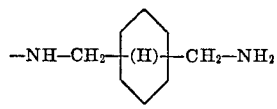

and the ring linkages are preferably meta- and para-linkages.

As cyclo-aliphatic polyamines, those polyamines are used which may also have 1 aliphatic C-atom between the cycloaliphatic ring and the amino group, preferably the polyamines of the general Formulas II and III which have already been proposed in the patent cited above:

The film and fiber-forming polyamides modified by the above-mentioned modification agents are prepared in accordance with methods that are common for the preparation of the basic unmodified polyamine in each case, using the common polyamide-forming starting substances, to which the modification agents are added. As polyamide-forming starting substances there may be cited, for example:

Lactams, in particular those having up to 13 ring atoms, such as ε-caprolactam and ω-lauryl lactam; the corresponding ω-amino-carboxylic acids, such as ε-amino-caproic acid, 11-amino-undecanoic acid, diammonium salts of alkylene diamines with aliphatic dicarboxylic acids, for example the coresponding salts of tetra-, hexa-, octa-methylene diamine with glutaric acid, adipic acid, pimelic acid, suberic acid, azelaic acid, and sebacic acid. Naturally, mixtures of the above-mentioned starting substances can also be used. Preferred starting compounds are ε-caprolactam and the corresponding ε-amino-caproic acid, as well as hexamethylene diammonium adipate (AH salt); they serve for the preparation of polyamide 6 or 66 modified accordingly.

The modification of the polyamides by the polyamines of Formula I and/or a mixture of polyamines of Formula I with polyamines of Formulas II and/or III may, for example, also be effected by a subsequent treatment of the corresponding unmodified polyamides. In this process the unmodified polyamides, preferably in the form of chips, are, for example, wetted by a solution of the modifying polyamine in a solvent that does not act upon the polyamide, such as water, subsequently the solvent is removed so that the polyamine remains in regular distribution on the polyamide chips. By means of short-time melting of the polyamide chips thus treated, practically the same modified polyamides are obtained as by the addition of the modification agents to the polymerization mixture. A sufficient short-time melting is the melting for the purpose of extrusion of the polyamide melt, or a simple re-extrusion. It goes without saying that, in this treatment the polyamide must not melt with decomposition.

The polyamines of the general Formula I are preferably prepared in accordance with the process described in U.S.

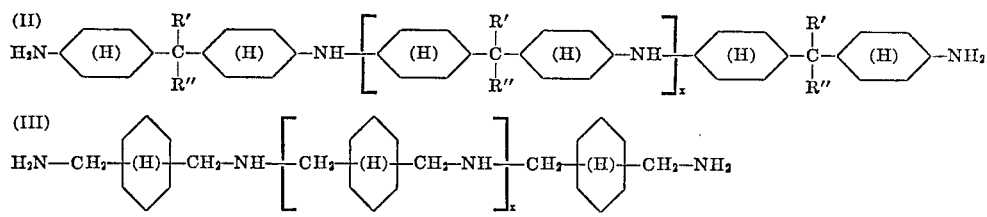

in which $x$ represents 0 or a whole number of from 1 to 30, preferably from 0 to 10, $R'$ represents H, —$CH_3$, —$C_2H_5$, $R''$ represents H, —$CH_3$, —$C_2H_5$, and the linkages of the rings in Formula III are preferably meta- and para-linkages.

As modification agents for film and fiber-forming polyamides, there may be used the compounds of Formula I alone or together with at least one of the polyamines corresponding to the general Formulas II and III. The amount of modification agents to be used is up to about 10% by weight, preferably of from 0.05 to 5% by weight, calculated on the final polymer to be expected.

patent application Ser. No. 65,293 filed August 19, 1970, i.e., filed concurrently herewith and entitled "Novel Polyamines and Process for Preparing Them" by means of desaminating catalytic hydrogenation, using as starting substance xylylene diamine—i.e., preferably p- or m-xylylene diamine, or mixtures of these xylylene diamines. O-xylylene diamine is less suitable, however, small amounts of it can also be used in admixture with p- and/or m-xylylene diamine. In case no uniform xylylene diamine isomer is used as starting compound, the linkages of the rings of final product I are, naturally, not uniform either, but constitute a mixture of p-, m-, and optionally, o-linkages. The polyamines and Process for Preparing Them" by means of amines of Formula III are preferably obtained by a similar catalytic hydrogenation, using the starting compounds (xylylene diamine[s]) disclosed in the above Canadian patent. In both cases, i.e., in the case of the preparation of polyamines of Formulas I and III, the hydrogenation product consists generally of a mixture of different polyamines of Formula I or III having a different polymerization degree. This mixture can readily be used as such, or after fractionation by vacuum distillation, for the preparation of modified polyamides in accordance with the present invention. Polyamines of Formula II are, for example, prepared as follows: If in Formula II R' as well as R" represent H, 4,4'-diamino-dicyclo-hexylmethane is used as starting compound, which is heated at 250° C. under a nitrogen atmosphere, in the presence of 1% by weight of Raney nickel, for a prolonged period of time (about 7 hours). The poly - 4,4' - diamino-dicyclo-hexyl-methane which is formed represents a mixture of several substances having different polymerization degrees (mainly with $x$ being between 0 to about 10). If R' and R" represent $CH_3$ or $C_2H_5$, substances which are analogous to 4,4'-diamino-dicyclo-hexyl-methane are, naturally used as starting compounds. The reaction conditions remain virtually unchanged.

The polyamides modified in accordance with the invention, as well as the products made thereof, have an excellent whiteness and a rather high molecular weight. The superiority of the polyamides modified according to the invention over those which have been modified by diethylene triamine and which belong to the prior art, is demonstrated as follows.

The following table shows the differences in whiteness, as well as in the molecular weight—expressed in $\eta_{rel}$ (measured with a solution of 1% strength in sulfuric acid of 96% strength at 25° C.)—with an approximately equal number of amino groups.

TABLE

| Modification of polyamide 6 | Percent of reflectance [1] | Content of $NH_2$ groups (milliequivalent/kg.) [2] | Viscosity $\eta_{rel}$ |
|---|---|---|---|
| Modified by 0.6% by weight of polyamine I with: n=1; $R_1$=H; $R_2$=—$NH_2$ | 44 | 90 | 2.7 |
| Modified by 0.3% by weight of diethylene triamine | 33 | 87 | 2.2 |

[1] Measured by means of the photo-electric reflectance photometer Elrepho of Messrs. Zeiss.
[2] Determined by potentiometric titration in m-cresolic solution with N/10 methanolic p-toluene sulfonic acid.

The addition of diethylene triamine leads to a strong discoloration of the polyamide. The same effect is known from the modification by polyethylene imine (Pat. No. 5,368 of the Amt fur Patent- und Erfindungswesen [Office for Patents and Invention] of the German Democratic Republic).

In comparison with diamines, the polyamines described as modification agents have the advantage that they provide, due to their smaller proportion of primary amino groups, polyamides having a higher molecular weight with the same content of amino groups.

The preparation of polyamides with a higher molecular weight is particularly important for the manufacture of carpet fibers.

If high viscosities are to be obtained with a high percentage of modification agents added, suitable phosphorus compounds can be added to the polymerization mixture for after-condensation, such as phosphoric acid or its organic esters, phosphonic and phosphinic acids or their organic esters, or phosphorous acids, in an amount of, preferably, up to 0.3% by weight, calculated on the total reaction mixture.

The following examples serve to illustrate the present invention.

The content of amino groups in all samples described was determined by means of potentiometric titration in m-cresolic solution with N/10 methanolic p-toluene sulfonic acid. All percentages given represent percent by weight. As indicated above, the polyamine of Formula I used in the following examples was prepared in accordance with the disclosure of copending patent application U.S. Ser. No. 65,293, filed Aug. 19, 1970.

More particularly, the polyamine used in the following examples can be prepared by the procedure of Example 1 of commonly-owned copending application Ser. No. 65,293 which reads as follows:

In a 50 liter autoclave provided with stirrer, a mixture was prepared consisting of 20 kg. of a mixture of m- and p- xylylene diamine in a ratio of 7:3 and 1% by weight of Raney nickel, "type CO" of Messrs. Degussa (i.e. a nickel catalyst containing chromium and copper); this mixture was hydrogenated at a temperature in the range of from 170 to 190° C. and a hydrogen pressure of 200 atmospheres gage. In the course of about 3 hours the hydrogen was absorbed very fast. The hydrogenation was stopped as soon as 50% of the amount necessary for the complete hydrogenation had been absorbed. After filtration of the reaction mixture, by-products having a low boiling point were distilled off under a pressure of 10 mm. of mercury and a sump temperature of 170° C., the residue was then kept at 170° C. for another 1 to 2 hours in order to separate small amounts of colloidally dissolved nickel. The precipitated nickel was filtered off with the addition of activated carbon. The remaining colorless polyamine had a nitrogen content of 14.8%, of which 9.0% in primary amino groups, 5.7% in secondary, and 0.1% in tertiary amino groups. This corresponded substantially to the theory for xylylene hexahydro-xylylene triamine. The molecular weight was 275 (theoretical value: 261). It was detected that half of the rings originating from xylylene diamine remained aromatic. The yield of polyamine was 60%.

EXAMPLE 1

3 kilograms of caprolactam were mixed with 200 milliliters of water and 18 grams of polyamine of Formula I with $n$ being 1, $R_1$ representing H, $R_2$ representing —$NH_2$, under a nitrogen atmosphere in an autoclave at 80° C.

Subsequently, the mixture was heated to 180° C., and this temperature was maintained for 1 hour. The temperature was then increased to 260° C., and the autoclave pressure was released during 1 hour at this temperature. After normal pressure had been reached, the mixture was after-polymerized for another 4 hours at 280° C.

The polyamide melt obtained was discharged as a cable under nitrogen pressure and was granulated after it had been cooled in water.

In order to remove the residual monomer and the oligomers, the chips were washed three times in de-ionized water for 2 hours each time at 80° C., subsequently they were dried in vacuo for 48 hours at 90° C. This polyamide had a viscosity of $\eta_{rel}$=2.8, measured with a solution of 1% strength in sulfuric acid of 96% strength at 25° C. The content of amino groups was 86 mili-equivalent/kg.

EXAMPLE 2

As described in Example 1, 3 kilograms of caprolactam were mixed with 200 milliliters of water, 40 grams of polyamine I with n being 1, $R_1$ representing H, $R_2$ representing —$NH_2$, and 8 grams of $H_3PO_4$ (of 100% strength); this mixture was polymerized. The viscosity of the product obtained was:

$$\eta_{rel}=2.2$$

The content of amino groups was 150 milli-equivalent/kg.

EXAMPLE 3

10 grams of AH salt (hexamethylene diammonium adipate) were mixed with 0.4% by weight of polyamine I with $n$ being 1, $R_1$ representing H, $R_2$ representing —$NH_2$, and were heated to 215° C. for 2 hours under a nitrogen atmosphere. Subsequently the mixture was heated at 270° C. during 1 hour and was after-condensed in vacuo at this temperature during 3 hours. As has been described in Example 1, the polyamine was then granulated and washed.

The viscosity of the polycondensate was:

$\eta_{rel} = 2.6$

The content of amino groups was 81 milli-equivalent/kg.

What is claimed is:

1. A process for the preparation of film- and fiber-forming modified polyamides with an increased content of amino groups which comprises polycondensing conventional polyamide-forming starting materials selected from lactams, omega-amino-carboxylic acids, diammonium salts of alkylene diamines with aliphatic dicarboxylic acids and mixtures thereof in the presence of an amount of up to 10% by weight, based on the total amount of starting materials, of at least one polyamine of the general formula (I)
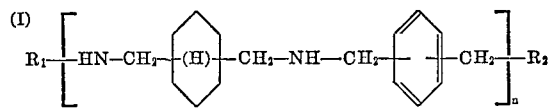

in which $n$ represents a whole number of from 1 to 10, $R_1$ represents

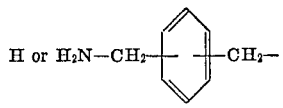

$R_2$ represents $NH_2$ or

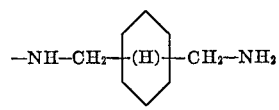

2. A process according to claim 1 wherein $n$ is from 1 to 3.

3. A process for the preparation of film- and fiber-forming modified polyamides with an increased content of amino groups which comprises polycondensing conventional polyamide forming starting materials selected from lactams, omega-amino-carboxylic acids, diammonium salts of alkylene diamines with aliphatic dicarboxylic acids and mixtures thereof in the presence of an amount of up to 10% by weight, based on the total amount of starting materials, of at least one polyamine of the general formula (I)
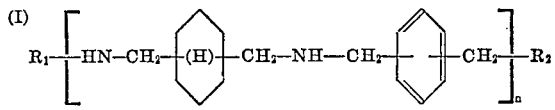

in which $n$ represents a whole number of from 1 to 10, $R_1$ represents

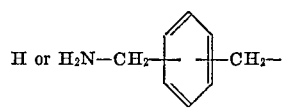

$R_2$ represents

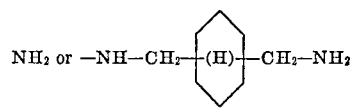

and at least one cycloaliphatic polyamine of the general formula

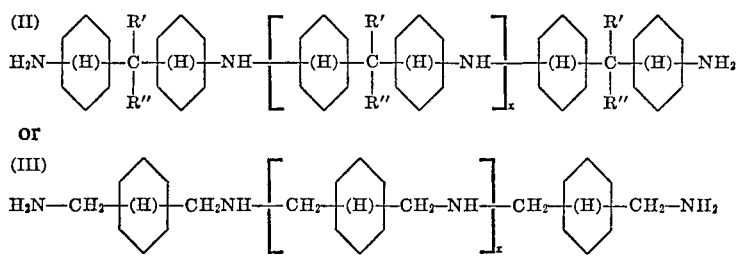

in which $x$ represents zero or a whole number of from 1 to 30, R' represents H, —CH$_3$, —C$_2$H$_5$, R" represents H, —CH$_3$, —C$_2$H$_5$.

4. A process according to claim 3 wherein $n$ is 1 to 3 and $x$ is zero to 10.

5. A modified polyamide 6 made by the process of claim 1.

6. A modified polyamide 6 made by the process of claim 3.

7. A modified polyamide 66 made by the process of claim 1.

8. A modified polyamide 66 made by the process of claim 3.

9. Fibers, filaments and films made from the polyamide of claim 5.

10. Fibers, filaments and films made from the polyamide of claim 6.

11. Fibers, filaments and films made from the polyamide of claim 7.

12. Fibers, filaments and films made from the polyamide of claim 8.

References Cited

UNITED STATES PATENTS

| 3,304,289 | 2/1967 | Ballentine et al. | 260—78 |
| 3,453,244 | 7/1969 | Preston | 260—78 |

FOREIGN PATENTS 837,201   3/1970   Canada.

HOWARD E. SCHAIN, Primary Examiner

U.S. Cl. X.R.

260—78 A, 78 L